United States Patent
Brown

(10) Patent No.: US 11,581,714 B1
(45) Date of Patent: Feb. 14, 2023

(54) SYSTEM FOR PULLING WIRE THROUGH A CONDUIT

(71) Applicant: Allen Brown, Orlando, FL (US)

(72) Inventor: Allen Brown, Orlando, FL (US)

(\*) Notice: Subject to any disclaimer, the term of this patent is extended or adjusted under 35 U.S.C. 154(b) by 150 days.

(21) Appl. No.: 16/847,786

(22) Filed: Apr. 14, 2020

(51) Int. Cl.
*H02G 1/08* (2006.01)
*H04N 5/225* (2006.01)

(52) U.S. Cl.
CPC ........... *H02G 1/081* (2013.01); *H04N 5/2253* (2013.01); *H04N 5/2256* (2013.01)

(58) Field of Classification Search
CPC ..................................................... H02G 1/081
See application file for complete search history.

(56) References Cited

U.S. PATENT DOCUMENTS

| | | | |
|---|---|---|---|
| 4,607,925 A | 8/1986 | Kamigaichi | |
| 4,757,258 A | 7/1988 | Kelly, Jr. | |
| 6,917,176 B2 | 7/2005 | Schempf | |
| 7,181,985 B2 | 2/2007 | MacMillan | |
| 8,485,501 B1 | 7/2013 | Hard | |
| 8,739,354 B2 | 6/2014 | Buckner | |
| 11,146,047 B2* | 10/2021 | King | H02G 1/081 |
| 2007/0170408 A1* | 7/2007 | Martinez | H02G 1/06 254/338 |
| 2008/0105067 A1* | 5/2008 | Frey | G01S 17/48 73/865.8 |
| 2014/0055793 A1* | 2/2014 | Johnsen | G01N 21/954 356/601 |
| 2021/0071803 A1* | 3/2021 | Warren | B65H 51/08 |
| 2022/0068117 A1* | 3/2022 | Marben | G08C 17/02 |

FOREIGN PATENT DOCUMENTS

WO         02070943         9/2002

\* cited by examiner

*Primary Examiner* — Cynthia Segura
(74) *Attorney, Agent, or Firm* — Kyle A. Fletcher, Esq.

(57) ABSTRACT

The system for pulling wire through a conduit includes a cable puller and a remote controller. The cable puller may pull a wire through a conduit. The wire may be removably coupled to a cable coupler located on the rear of the cable puller. The cable puller may be inserted into a first end of the conduit and may progress to a second end of the conduit under the influence of a plurality of tractors. A camera that is mounted on a faceplate at the front of a housing of the cable puller may transmit one or more images to the remote controller. One or more visible light sources and one or more infrared light sources may provide illumination for the camera. Movements of the cable puller may be controlled remotely using the remote controller.

20 Claims, 5 Drawing Sheets

SYSTEM FOR PULLING WIRE THROUGH A CONDUIT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of electrician tools, more specifically, a system for pulling wire through a conduit.

SUMMARY OF INVENTION

The system for pulling wire through a conduit comprises a cable puller and a remote controller. The cable puller may pull a wire through a conduit. The wire may be removably coupled to a cable coupler located on the rear of the cable puller. The cable puller may be inserted into a first end of the conduit and may progress to a second end of the conduit under the influence of a plurality of tractors. A camera that is mounted on a faceplate at the front of a housing of the cable puller may transmit one or more images to the remote controller. One or more visible light sources and one or more infrared light sources may provide illumination for the camera. Movements of the cable puller may be controlled remotely using the remote controller.

An object of the invention is to pull wire through a conduit using a cable puller.

Another object of the invention is to propel the cable puller using a plurality of tractors.

A further object of the invention is to control the cable puller remotely using a remote control.

Yet another object of the invention is to provide a camera and one or more sources of illumination on the front of the cable puller and to transmit images from the camera to the remote control.

These together with additional objects, features and advantages of the system for pulling wire through a conduit will be readily apparent to those of ordinary skill in the art upon reading the following detailed description of the presently preferred, but nonetheless illustrative, embodiments when taken in conjunction with the accompanying drawings.

In this respect, before explaining the current embodiments of the system for pulling wire through a conduit in detail, it is to be understood that the system for pulling wire through a conduit is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the system for pulling wire through a conduit.

It is therefore important that the claims be regarded as including such equivalent construction insofar as they do not depart from the spirit and scope of the system for pulling wire through a conduit. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
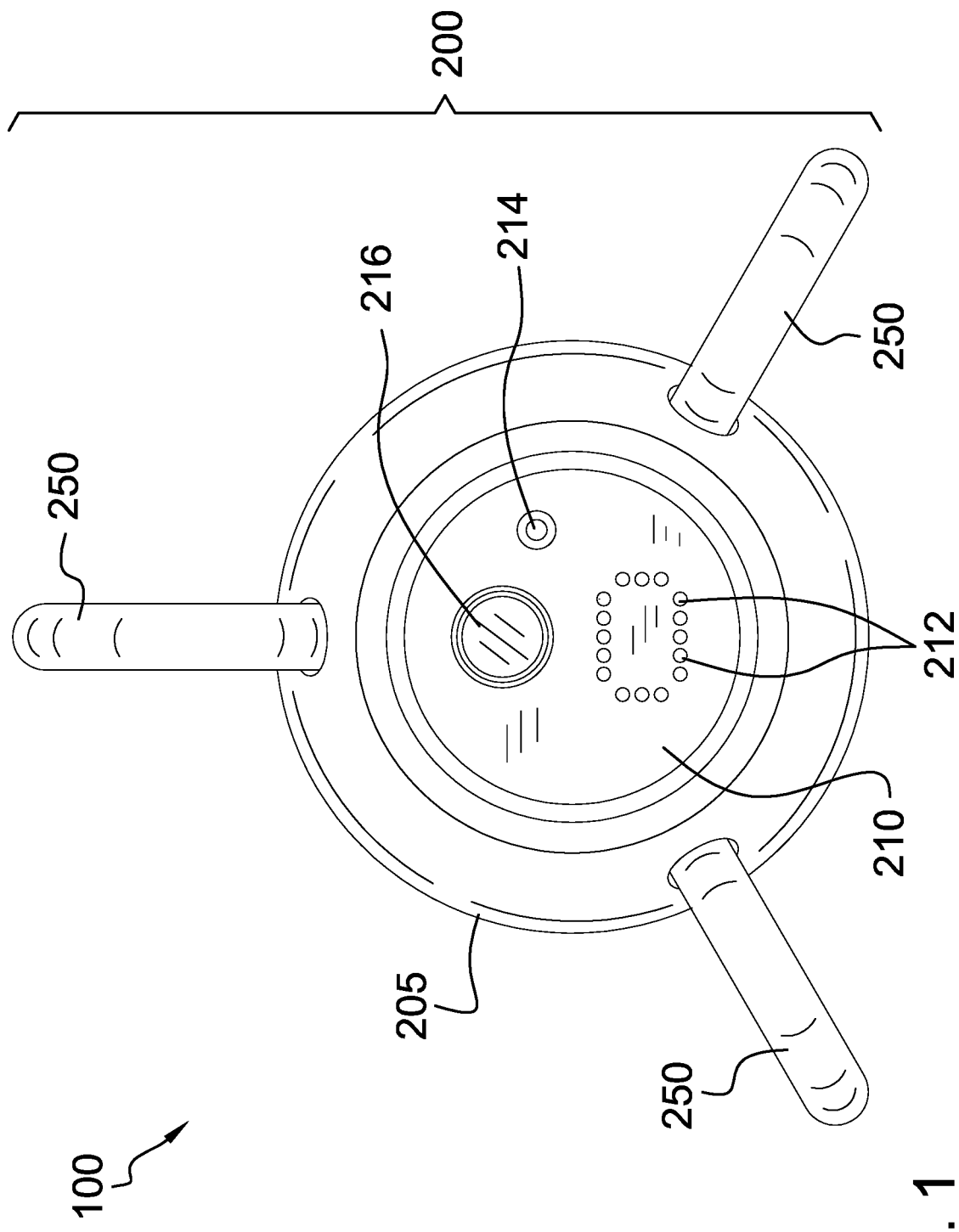
FIG. 1 is a front view of an embodiment of the disclosure.
Figure 2:
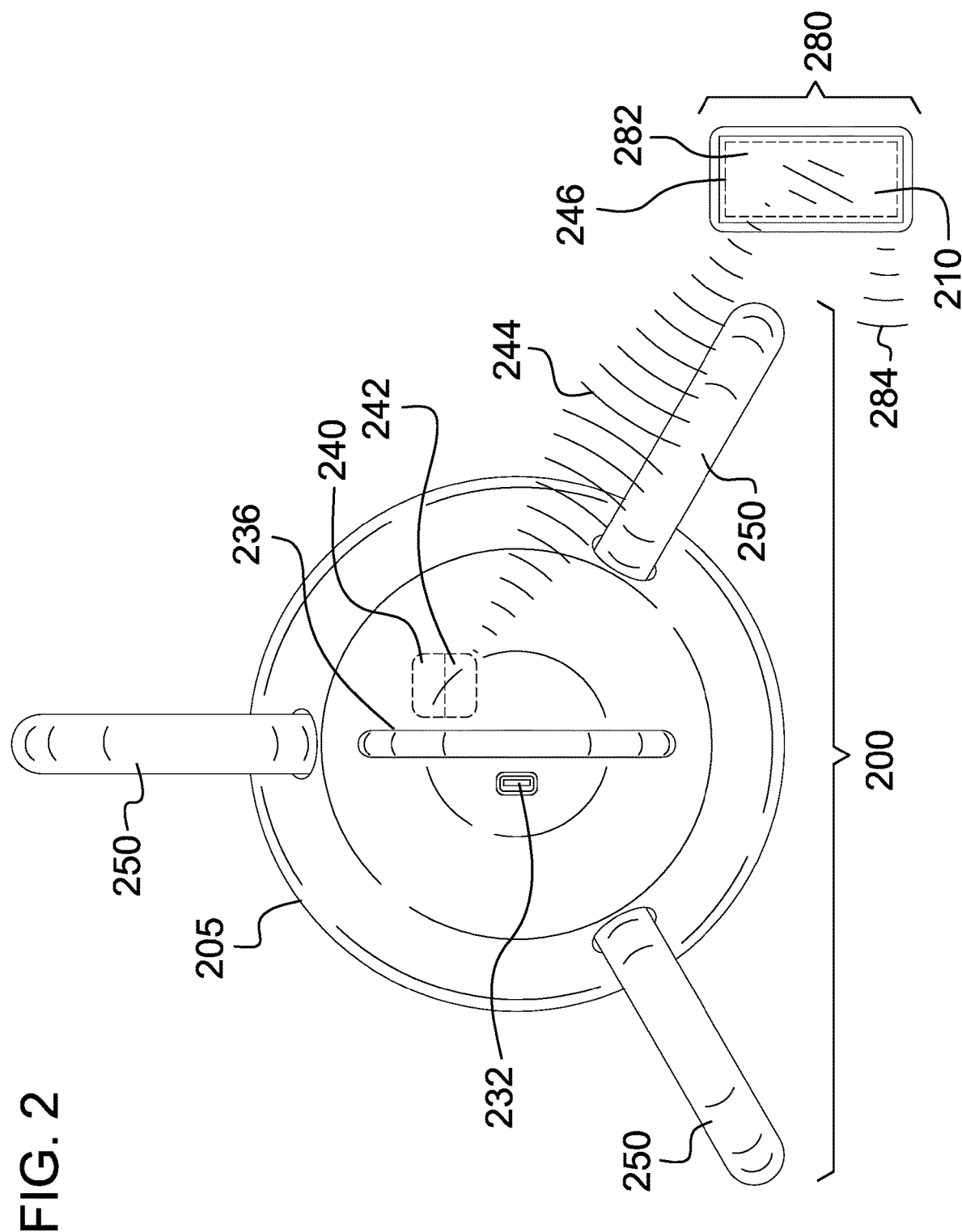
FIG. 2 is a rear view of an embodiment of the disclosure.
Figure 3:
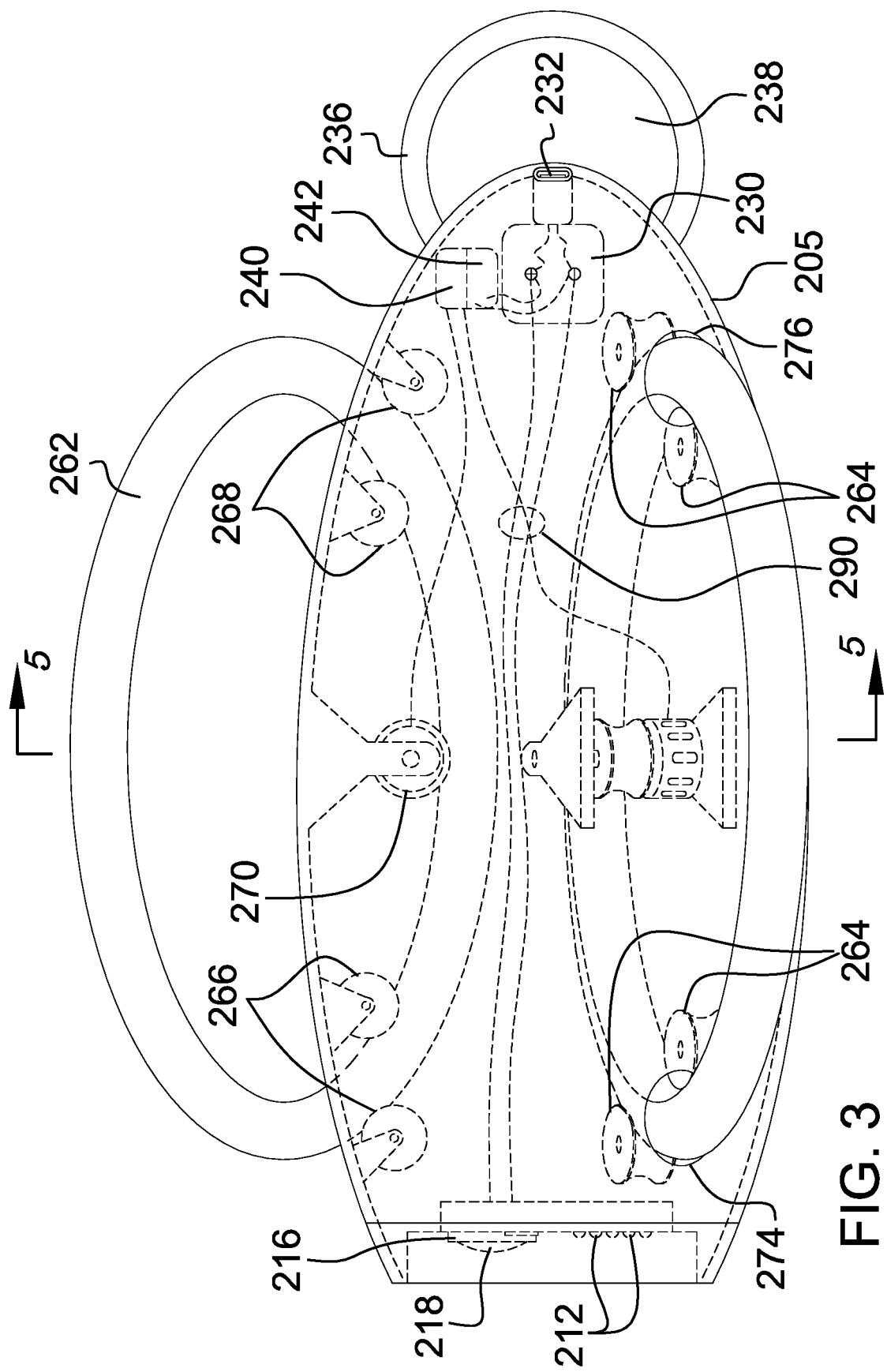
FIG. 3 is a side view of an embodiment of the disclosure.
Figure 4:
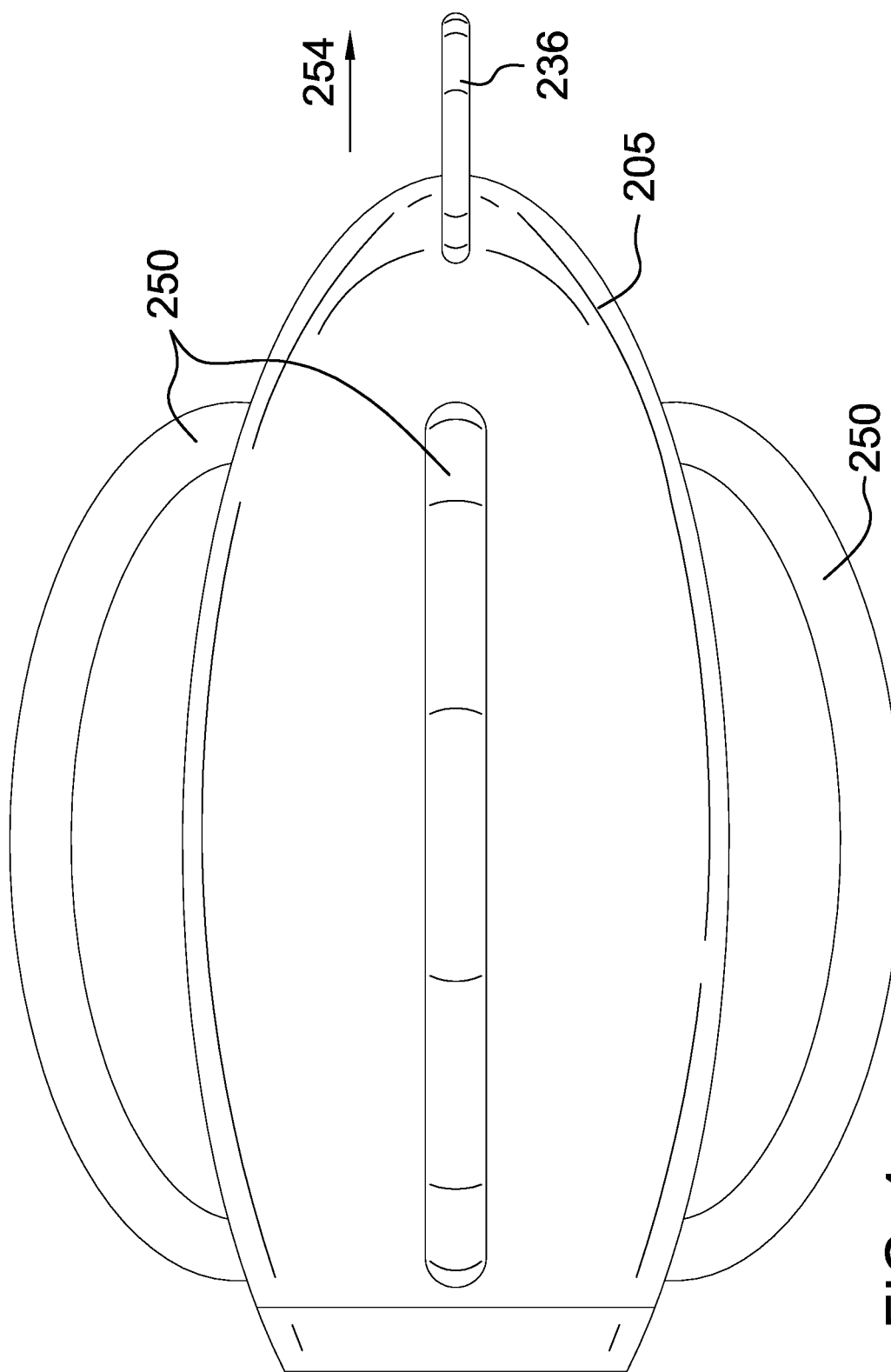
FIG. 4 is a top view of an embodiment of the disclosure.
Figure 5:
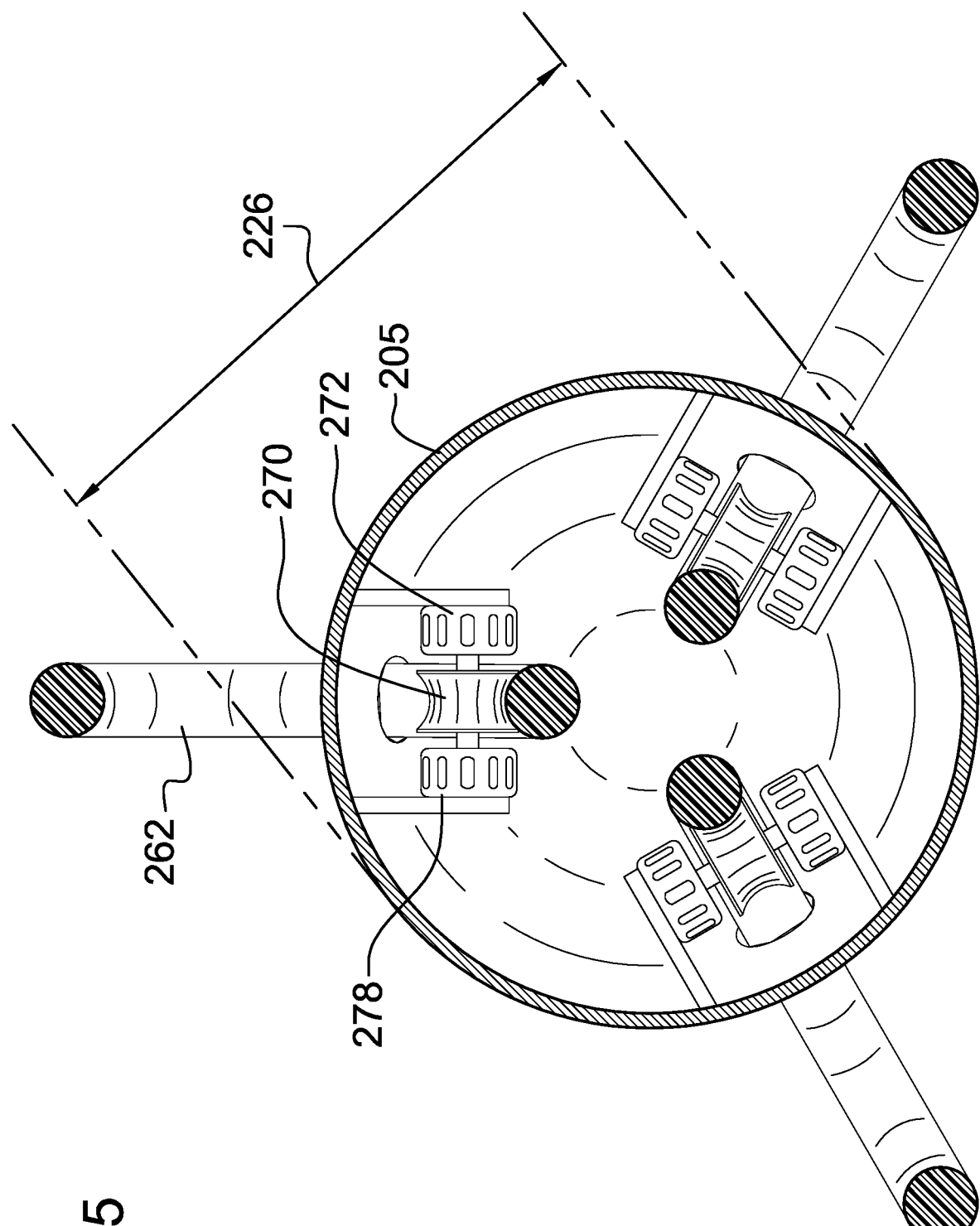
FIG. 5 is a cross-sectional view of an embodiment of the disclosure across 5-5 as shown in FIG. 3.

Detailed reference will now be made to a first potential embodiment of the disclosure, which is illustrated in FIGS. 1 through 5.

The system for pulling wire through a conduit 100 (hereinafter invention) comprises a cable puller 200 and a remote controller 280. The cable puller 200 may pull a wire through a conduit. The wire may be removably coupled to a cable coupler 236 located on the rear of the cable puller 200. The cable puller 200 may be inserted into a first end of the conduit and may progress to a second end of the conduit under the influence of a plurality of tractors 250. A camera 216 that is mounted on a faceplate 210 at the front of a housing 205 of the cable puller 200 may transmit one or more images 220 to the remote controller 280. One or more visible light sources 212 and one or more infrared light sources 214 may provide illumination for the camera 216. Movements of the cable puller 200 may be controlled remotely using the remote controller 280. The cable puller 200 may comprise the housing 205, a battery 230, a control unit 240, and the plurality of tractors 250.

The housing 205 may be an enclosure for the control unit 240, the battery 230, the plurality of tractors 250, the camera 216, the one or more visible light sources 212, and the one or more infrared light sources 214. The housing 205 may comprise the faceplate 210 and the cable coupler 236. The size and shape of the housing 205 may be conducive to passing through the conduit. As non-limiting examples, the shape of the housing 205 may be cylindrical or ovoid. A lateral diameter 226 of the housing 205 plus two times the diameter of a flexible ring 262 are less than or equal to an inside diameter of the conduit such that the housing 205 and the plurality of tractors 250 fit within the conduit.

The faceplate 210 may be the leading surface of the housing 205. The faceplate 210 may comprise the camera 216, the one or more visible light sources 212, and the one or more infrared light sources 214. The camera 216 may capture the one or more images 220 that may be sent to the remote controller 280. The one or more images 220 may be one or more still images, one or more video clips, or both. The camera 216 may be an optical instrument that captures the one or more images 220 or records the one or more video clips. The camera 216 may pass the one or more images 220 or the one or more video clips to the remote controller 280 via a wireless link 244. In some embodiments, the camera 216 may be sensitive to Infrared radiation (IR). Imagery obtained using IR light may assist in detecting temperature changes indicative of broken pipes, cable overheating, bends, and disruptions. The front of the camera 216 may comprise a lens 218 to focus a scene onto the camera 216. The lens 218 may be offset from the front of the housing to reduce the risk of damage to the lens 218.

The one or more visible light sources 212 may provide illumination for the camera 216. The one or more visible light sources 212 may be light emitting diodes (LEDs). The one or more infrared light sources 214 may provide infrared illumination for the camera 216. The one or more infrared light sources 214 may be infrared light emitting diodes (IR LEDs).

The cable coupler 236 may be a mechanical anchoring point for the wire being pulled through the conduit. The cable coupler 236 may be coupled to the rear of the housing 205. The wire may be detachably coupled to the cable coupler 236 my passing the wire through a cable aperture 238 and folding the wire back upon itself. The wire may be twisted or taped to secure the wire to the cable coupler 236 for the duration of a trip through the conduit.

The battery 230 may comprise one or more energy-storage devices. The battery 230 may be a source of electrical energy to operate the camera 216, the one or more visible light sources 212, the one or more infrared light sources 214, and the plurality of tractors 250. The battery 230 may be replaceable or rechargeable. In some embodiments, the battery 230 may be recharged by plugging an external power source into a charging port 232 that is accessible on the housing 205.

The control unit 240 may control the operation of the plurality of tractors 250, the camera 216, the one or more visible light sources 212, and the one or more infrared light sources 214. Specifically, the control unit 240 may determine when to activate and deactivate the plurality of tractors 250 and which direction to move the housing 205. The control unit 240 may determine when to capture the one or more images 220 using the camera 216. The control unit 240 may determine when to activate and deactivate the one or more visible light sources 212 and the one or more infrared light sources 214.

The control unit 240 may communicate with the remote controller 280 wirelessly via a transceiver 242. As non-limiting examples, the remote controller 280 may be a smartphone, a tablet computer, or other a smart device executing an application program 246 that is specific to the invention 100. The control unit 240 may send the one or more images 220 originating at the camera 216 to the remote controller 280 via the wireless link 244 such that the one or more images 220 may be displayed on the remote controller 280.

The plurality of tractors 250 may move the cable puller 200 through the conduit when the plurality of tractors 250 are activated. The plurality of tractors 250 may be operable to reverse the direction of travel such that the plurality of tractors 250 may move the housing 205 in a forward direction 252 or in a reverse direction 254. In a preferred embodiment, there may be three tractors.

An individual tractor selected from the plurality of tractors 250 may comprise the flexible ring 262, a plurality of guide wheels 264, a drive wheel 270 and a first motor 272. The flexible ring 262 may be a continuous loop of semi-rigid material. The flexible ring 262 may travel a path that takes the flexible ring 262 inside of the housing 205 and outside of the housing 205. The flexible ring 262 may enter and exit the housing 205 at a front tractor aperture 274 and a rear tractor aperture 276. While inside of the housing 205 the flexible ring 262 may contact the drive wheel 270 and the drive wheel 270 may propel the flexible ring 262. While outside of the housing 205 the flexible ring 262 may contact the interior wall of the conduit and the flexible ring 262 may propel the cable puller 200 through the conduit. In some embodiments, the flexible ring 262 may be an O-ring.

The plurality of guide wheels 264 may be mounted inside of the housing 205 such that the plurality of guide wheels 264 may define a path for the flexible ring 262 to follow within the housing 205. The plurality of guide wheels 264 may guide the flexible ring 262 through the front tractor aperture 274 and through the rear tractor aperture 276 such that the flexible ring 262 is not damaged by the front tractor aperture 274 and the rear tractor aperture 276. The plurality of guide wheels 264 may be used in pairs. Forward guide pair 266 may be located on either side of the front tractor aperture 274 to guide the flexible ring 262 through the front tractor aperture 274. Rear guide pair 268 may be located on either side of the rear tractor aperture 276 to guide the flexible ring 262 through the rear tractor aperture 276.

The drive wheel 270 may be coupled to the first motor 272 and the first motor 272 may be mounted on the interior wall of the housing 205. The drive wheel 270 may be located in a position to contact the flexible ring 262 such that energization of the first motor 272 may cause the drive wheel 270 to turn and to move the flexible ring 262. Movement of the flexible ring 262 may cause movement of the cable puller 200 within the conduit. The direction that the drive wheel 270 turns may be dependent upon the polarity of the voltage applied to the first motor 272. Therefore, the direction that the housing 205 travels may be reversed by having the control unit 240 reverse the polarity of the voltage and the housing 205 may be stopped by removing the voltage from the first motor 272.

In some embodiments, the individual tractor may comprise a second motor 278 which may also be mounted on the interior wall of the housing 205. The second motor 278 may be coupled to the drive wheel 270 opposite the first motor 272 and may be wired to turn in a direction that is complementary to the direction of the first motor 272 such that the second motor 278 reinforces the effort exerted by the first motor 272 to turn the drive wheel 270.

The control unit 240, the battery 230, the camera 216, the one or more visible light sources 212, the one or more infrared light sources 214, the charging port 232, and the plurality of tractors 250 may be internally coupled via wiring 290 within the housing 205.

The remote controller 280 may be operable to remotely control the cable puller 200 via the wireless link 244. Specifically, the remote controller 280 may start and stop movement of the cable puller 200 and may select the direction of the cable puller 200 movement. The remote controller 280 may energize and deenergize the one or more visible light sources 212 and the one or more infrared light sources 214. The remote controller 280 may also be operable to display the one or more images 220 sent from the cable puller 200 on a video display screen 282 of the remote controller 280.

In some embodiments, the control unit 240 may detect resistance to further movement of the cable puller 200 and may transmit a motion resistance alert 284 to the remote controller 280. The remote controller 280 may report the motion resistance alert 284 using the video display screen 282, audible alarms, or both. As non-limiting examples, the control unit 240 may detect increased current draw by the plurality of tractors 250 or may visually detect a decrease in speed or a stoppage of movement. In response to such a detection, the control unit 240 may form the motion resistance alert 284 and transmit the motion resistance alert 284 to the remote controller 280. The remote controller 280 may display messages, images, or both and/or may play an audible tone, a sequence of audible tones, pre-recorded audio message, or a combination thereof via a sound transducer within the remote controller 280.

In use, the wires may be coupled to the cable coupler 236 on the rear of the cable puller 200 and the cable puller 200 may be placed into the first end of the conduit. The remote controller 280 may be used to move the cable puller 200 forward through the conduit. The remote controller 280 may illuminate the one or more visible light sources 212 and/or the one or more infrared light sources 214 and the camera 216 may transmit the one or more images 220 to the remote controller 280 so that progress of the cable puller 200 may be monitored and problems within the conduit may be seen. Responsive to a detection that movement of the cable puller 200 is impeded, the control unit 240 may send the motion resistance alert 284 to the remote controller 280. After notification of the motion resistance alert 284, the remote controller 280 may be used to reverse the direction of the cable puller 200 and to attempt forward motion again.

Definitions

As used in this disclosure, an "aperture" is an opening in a surface. Aperture may be synonymous with hole, slit, crack, gap, slot, or opening.

As used in this disclosure, an "application" or "app" is software that is specifically designed for use with a personal computing device.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used in this disclosure, a "camera" is a sensor that converts light into electric signals that encode the spatial orientation of the captured light in a manner that reproduces the images seen by a human eye.

As used herein, the words "couple", "couples", "coupled" or "coupling", refer to connecting, either directly or indirectly, and does not necessarily imply a mechanical connection.

As used in this disclosure, a "diameter" of an object is a straight line segment that passes through the center (or center axis) of an object. The line segment of the diameter is terminated at the perimeter or boundary of the object through which the line segment of the diameter runs.

As used herein, "energize" and/or "energization" refer to the application of an electrical potential to a system or subsystem.

As used in this disclosure, an "external power source" is a source of the energy that is externally provided to enable the operation or recharging of a device. Examples of external power sources include, but are not limited to, electrical power sources and compressed air sources.

As used herein, "front" indicates the side of an object that is closest to a forward direction of travel under normal use of the object or the side or part of an object that normally presents itself to view or that is normally used first. "Rear" or "back" refers to the side that is opposite the front.

As used in this disclosure, a "housing" is a rigid casing that encloses and protects one or more devices.

As used herein, "inside diameter" or "inner diameter" refers to a measurement made on a hollow object. Specifically, the inside diameter is the distance from one inside wall to the opposite inside wall. If the object is round, then the inside diameter is a true diameter, however the term may also be used in connection with a square object in which case the inside diameter is simply the narrowest inside measurement that passes through the center of the object.

As used in this disclosure, the word "interior" is used as a relational term that implies that an object is located or contained within the boundary of a structure or a space.

As used in this disclosure, the word "lateral" refers to the sides of an object or movement towards a side. Lateral directions are generally perpendicular to longitudinal directions. "Laterally" refers to movement in a lateral direction.

As used in this disclosure, a "lens" is a transparent substance through which light can pass. A lens may or may not be formed with curved surfaces that are used to concentrate or disperse the light that travels through the lens.

As used in this disclosure, a "motor" refers to a device that transforms energy from an external power source into mechanical energy.

As used herein, the word "ovoid" refers to a three dimensional structure with an oval shape. The relationship between an ovoid and an oval is analogous to the relationship between an ellipsoid and an ellipse.

As used in this disclosure, "resilient" or "semi-rigid" refer to an object or material which will deform when a force is applied to it and which will return to its original shape when the deforming force is removed.

As used herein, "smart device" refers to a portable electrical device comprising at least a processor, display, input device, and network connection. The input device is generally a touch screen, keyboard, or voice recognition. The network connection is generally wireless. Non-limiting examples of smart devices may include smartphones, tablets, personal digital assistants, laptop computers, and smartwatches.

As used herein, a "tablet computer" or "tablet" refers to a mobile computing device packaged as a single, monolithic unit—similar in appearance to a paper tablet. Typically, tablet computers have a touch sensitive, flat video display covering most of the front surface and do not have a keyboard; although many tablet computers may be mated with a separate keyboard accessory. Tablet computers generally comprise one or more microprocessors, memory, and a rechargeable battery internal to the tablet. Most tablet computers comprise a wireless network connection, typically via a WiFi interface. Many tablet computers comprise an internal camera, microphone, and one or more audio speakers. Interaction between the user and a tablet computer is generally via the touch screen using a stylus or fingers and may involve the use of 'gestures' which are specific motions on the touch screen which are interpreted by the tablet computer to magnify or shrink the display, open, close, or switch between applications, scroll, or perform other tablet computer functions.

As used in this disclosure, a "transceiver" is a device that is used to transmit and/or receive signals. The signals may be audible, optical, or RF in nature.

As used in this disclosure, a "transducer" is a device that converts a physical quantity, such as pressure or brightness into an electrical signal or a device that converts an electrical signal into a physical quantity.

Throughout this document references to "wire", "wires", "wired", or "wiring" may describe and/or show a single conductor when, in fact, two conductors may be required to power or control a subsystem; a convention used herein is that the common return conductor to which all electrical subsystems are connected may not be shown in order to clarify the figures. This common return conductor is a continuous electrical path and does not pass through any type of switch or other electrical component other than the possibility of passing through one or more connectors.

As used in this disclosure, "wireless" is an adjective that is used to describe a communication channel that does not require the use of physical cabling.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A system for pulling wire through a conduit comprising:
    a cable puller and a remote controller;
    wherein the cable puller pulls a wire through a conduit;
    wherein the wire is removably coupled to a cable coupler located on the rear of the cable puller;
    wherein the cable puller is inserted into a first end of the conduit and progresses to a second end of the conduit under the influence of a plurality of tractors;
    wherein a camera that is mounted on a faceplate at the front of a housing of the cable puller transmits one or more images to the remote controller;
    wherein one or more visible light sources and one or more infrared light sources provide illumination for the camera;
    wherein movements of the cable puller is controlled remotely using the remote controller;
    wherein the cable puller comprises the housing, a battery, a control unit, and the plurality of tractors.

2. The system for pulling wire through a conduit according to claim 1
    wherein the housing is an enclosure for the control unit, the battery, the plurality of tractors, the camera, the one or more visible light sources, and the one or more infrared light sources;
    wherein the housing comprises the faceplate and the cable coupler;
    wherein a lateral diameter of the housing plus two times the diameter of a flexible ring are less than or equal to an inside diameter of the conduit such that the housing and the plurality of tractors fit within the conduit.

3. The system for pulling wire through a conduit according to claim 2
    wherein the faceplate is the leading surface of the housing;
    wherein the faceplate comprises the camera, the one or more visible light sources, and the one or more infrared light sources;
    wherein the camera captures the one or more images that are sent to the remote controller;
    wherein the one or more images are one or more still images, one or more video clips, or both;
    wherein the camera is an optical instrument that captures the one or more images or records the one or more video clips;
    wherein the camera passes the one or more images or the one or more video clips to the remote controller via a wireless link.

4. The system for pulling wire through a conduit according to claim 3
    wherein the camera is sensitive to Infrared radiation.

5. The system for pulling wire through a conduit according to claim 3
    wherein the front of the camera comprises a lens to focus a scene onto the camera;
    wherein the lens is offset from the front of the housing to reduce the risk of damage to the lens.

6. The system for pulling wire through a conduit according to claim 3
    wherein the one or more visible light sources provide illumination for the camera;
    wherein the one or more visible light sources are light emitting diodes;
    wherein the one or more infrared light sources provide infrared illumination for the camera;
    wherein the one or more infrared light sources are infrared light emitting diodes.

7. The system for pulling wire through a conduit according to claim 6
    wherein the cable coupler is a mechanical anchoring point for the wire being pulled through the conduit;
    wherein the cable coupler is coupled to the rear of the housing.

8. The system for pulling wire through a conduit according to claim 7
    wherein the battery comprises one or more energy-storage devices;

wherein the battery is a source of electrical energy to operate the camera, the one or more visible light sources, the one or more infrared light sources, and the plurality of tractors;
wherein the battery is replaceable or rechargeable.

9. The system for pulling wire through a conduit according to claim 8
wherein the battery is recharged by plugging an external power source into a charging port that is accessible on the housing.

10. The system for pulling wire through a conduit according to claim 9
wherein the control unit controls the operation of the plurality of tractors, the camera, the one or more visible light sources, and the one or more infrared light sources;
wherein the control unit determines when to activate and deactivate the plurality of tractors and which direction to move the housing;
wherein the control unit determines when to capture the one or more images using the camera;
wherein the control unit determines when to activate and deactivate the one or more visible light sources and the one or more infrared light sources.

11. The system for pulling wire through a conduit according to claim 10
wherein the control unit communicates with the remote controller wirelessly via a transceiver.

12. The system for pulling wire through a conduit according to claim 11
wherein the remote controller is a smartphone, a tablet computer, or other a smart device executing an application program that is specific to the system for pulling wire through a conduit;
wherein the control unit sends the one or more images originating at the camera to the remote controller via the wireless link such that the one or more images are displayed on the remote controller.

13. The system for pulling wire through a conduit according to claim 11
wherein the plurality of tractors move the cable puller through the conduit when the plurality of tractors are activated;
wherein the plurality of tractors are operable to reverse the direction of travel such that the plurality of tractors move the housing in a forward direction or in a reverse direction.

14. The system for pulling wire through a conduit according to claim 13
wherein an individual tractor selected from the plurality of tractors comprises the flexible ring, a plurality of guide wheels, a drive wheel and a first motor;
wherein the flexible ring is a continuous loop of semi-rigid material;
wherein the flexible ring travels a path that takes the flexible ring inside of the housing and outside of the housing;
wherein the flexible ring enters and exit the housing at a front tractor aperture and a rear tractor aperture;
wherein while inside of the housing the flexible ring contacts the drive wheel and the drive wheel propels the flexible ring;
wherein while outside of the housing the flexible ring contacts the interior wall of the conduit and the flexible ring propels the cable puller through the conduit.

15. The system for pulling wire through a conduit according to claim 14
wherein the flexible ring is an O-ring.

16. The system for pulling wire through a conduit according to claim 14
wherein the plurality of guide wheels are mounted inside of the housing such that the plurality of guide wheels define a path for the flexible ring to follow within the housing;
wherein the plurality of guide wheels guide the flexible ring through the front tractor aperture and through the rear tractor aperture such that the flexible ring is not damaged by the front tractor aperture and the rear tractor aperture;
wherein the plurality of guide wheels are used in pairs;
wherein forward guide pair is located on either side of the front tractor aperture to guide the flexible ring through the front tractor aperture;
wherein rear guide pair is located on either side of the rear tractor aperture to guide the flexible ring through the rear tractor aperture.

17. The system for pulling wire through a conduit according to claim 16
wherein the drive wheel is coupled to the first motor and the first motor is mounted on the interior wall of the housing;
wherein the drive wheel is located in a position to contact the flexible ring such that energization of the first motor causes the drive wheel to turn and to move the flexible ring;
wherein movement of the flexible ring causes movement of the cable puller within the conduit;
wherein the direction that the drive wheel turns is dependent upon the polarity of the voltage applied to the first motor;
wherein the direction that the housing travels is reversed by having the control unit reverse the polarity of the voltage and the housing is stopped by removing the voltage from the first motor.

18. The system for pulling wire through a conduit according to claim 17
wherein the individual tractor comprises a second motor which is mounted on the interior wall of the housing;
wherein the second motor is coupled to the drive wheel opposite the first motor and is wired to turn in a direction that is complementary to the direction of the first motor such that the second motor reinforces the effort exerted by the first motor to turn the drive wheel.

19. The system for pulling wire through a conduit according to claim 17
wherein the remote controller is operable to remotely control the cable puller via the wireless link;
wherein the remote controller starts and stops movement of the cable puller and selects the direction of the cable puller movement;
wherein the remote controller energizes and deenergizes the one or more visible light sources and the one or more infrared light sources;
wherein the remote controller is operable to display the one or more images sent from the cable puller on a video display screen of the remote controller.

20. The system for pulling wire through a conduit according to claim 19
wherein the control unit detects resistance to further movement of the cable puller and transmits a motion resistance alert to the remote controller;

wherein the remote controller reports the motion resistance alert using the video display screen, audible alarms, or both.

* * * * *